United States Patent
Wada

(10) Patent No.: US 9,883,108 B2
(45) Date of Patent: Jan. 30, 2018

(54) IMAGING APPARATUS AND IMAGE BLUR CORRECTION METHOD

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/592,362

(22) Filed: May 11, 2017

(65) Prior Publication Data
US 2017/0244901 A1    Aug. 24, 2017

Related U.S. Application Data

(63) Continuation of application No. PCT/JP2015/081893, filed on Nov. 12, 2015.

(30) Foreign Application Priority Data

Dec. 2, 2014    (JP) ................................ 2014-244096

(51) Int. Cl.
H04N 5/232    (2006.01)
G03B 13/36    (2006.01)

(52) U.S. Cl.
CPC ......... *H04N 5/23287* (2013.01); *G03B 13/36* (2013.01); *H04N 5/23258* (2013.01)

(58) Field of Classification Search
CPC . H04N 5/23287; H04N 5/23258; G03B 13/36
(Continued)

(56) References Cited

U.S. PATENT DOCUMENTS 5,649,237 A    7/1997  Okazaki
7,430,366 B2 *    9/2008  Togawa ............... H04N 5/2254
348/208.2

(Continued)

FOREIGN PATENT DOCUMENTS

JP    H 7-225405 A    8/1995
JP    H 10-301157 A    11/1998
(Continued)

OTHER PUBLICATIONS

International Search Report dated Feb. 16, 2016, issued by the International Searching Authority in counterpart PCT/JP2015/081893 (PCT/ISA/210).
(Continued)

*Primary Examiner* — Lin Ye
*Assistant Examiner* — Chan Nguyen
(74) *Attorney, Agent, or Firm* — Sughrue Mion, PLLC

(57) ABSTRACT

An imaging apparatus includes: a driving unit that moves a focus lens; a focusing unit that determines a focus state and outputs a focusing signal indicating a focus position of the focus lens; a control unit that controls the driving unit based on the focusing signal; an acceleration detection unit that detects acceleration in directions of three orthogonal axes; a distance calculation unit that calculates an acceleration component in an optical axis direction based on the acceleration in the directions of the three orthogonal axes detected by the acceleration detection unit and calculates an object distance corresponding to the focus position indicated by the focusing signal based on the acceleration component in the optical axis direction; and a shake correction unit that corrects an image blur caused by a translational shake in directions of two orthogonal axes perpendicular to at least an optical axis as defined herein.

19 Claims, 8 Drawing Sheets

(58) Field of Classification Search
USPC .................................................... 348/208.2
See application file for complete search history.

(56) References Cited

U.S. PATENT DOCUMENTS

| | | | | |
|---|---|---|---|---|
| 8,477,201 B2* | 7/2013 | Washisu | ............... | G02B 27/646 |
| | | | | 348/208.99 |
| 2013/0163972 A1* | 6/2013 | Miyazawa | ......... | H04N 5/23258 |
| | | | | 396/55 |
| 2014/0063279 A1* | 3/2014 | Ogura | ................ | H04N 5/23209 |
| | | | | 348/222.1 |

FOREIGN PATENT DOCUMENTS

| JP | 2005-173431 A | 6/2005 |
|---|---|---|
| JP | 2006-343645 A | 12/2006 |
| JP | 2012-128356 A | 7/2012 |

OTHER PUBLICATIONS

Written Opinion dated Feb. 16, 2016, issued by the International Searching Authority in counterpart PCT/JP2015/081893 (PCT/ISA/237).

* cited by examiner

|   | $az_0$ | $az_1$ | $az_2$ | — — — | $az_m$ |
|---|---|---|---|---|---|
| $I_0$ | $P_{0,0}$ | $P_{1,0}$ | $P_{2,0}$ | | $P_{m,0}$ |
| $I_1$ | $P_{0,1}$ | $P_{1,1}$ | $P_{2,1}$ | | $P_{m,1}$ |
| $I_2$ | $P_{0,2}$ | $P_{1,2}$ | $P_{2,2}$ | | $P_{m,2}$ |
| ⋮ | | | | | |
| $I_n$ | $P_{0,n}$ | $P_{1,n}$ | $P_{2,n}$ | | $P_{m,n}$ |

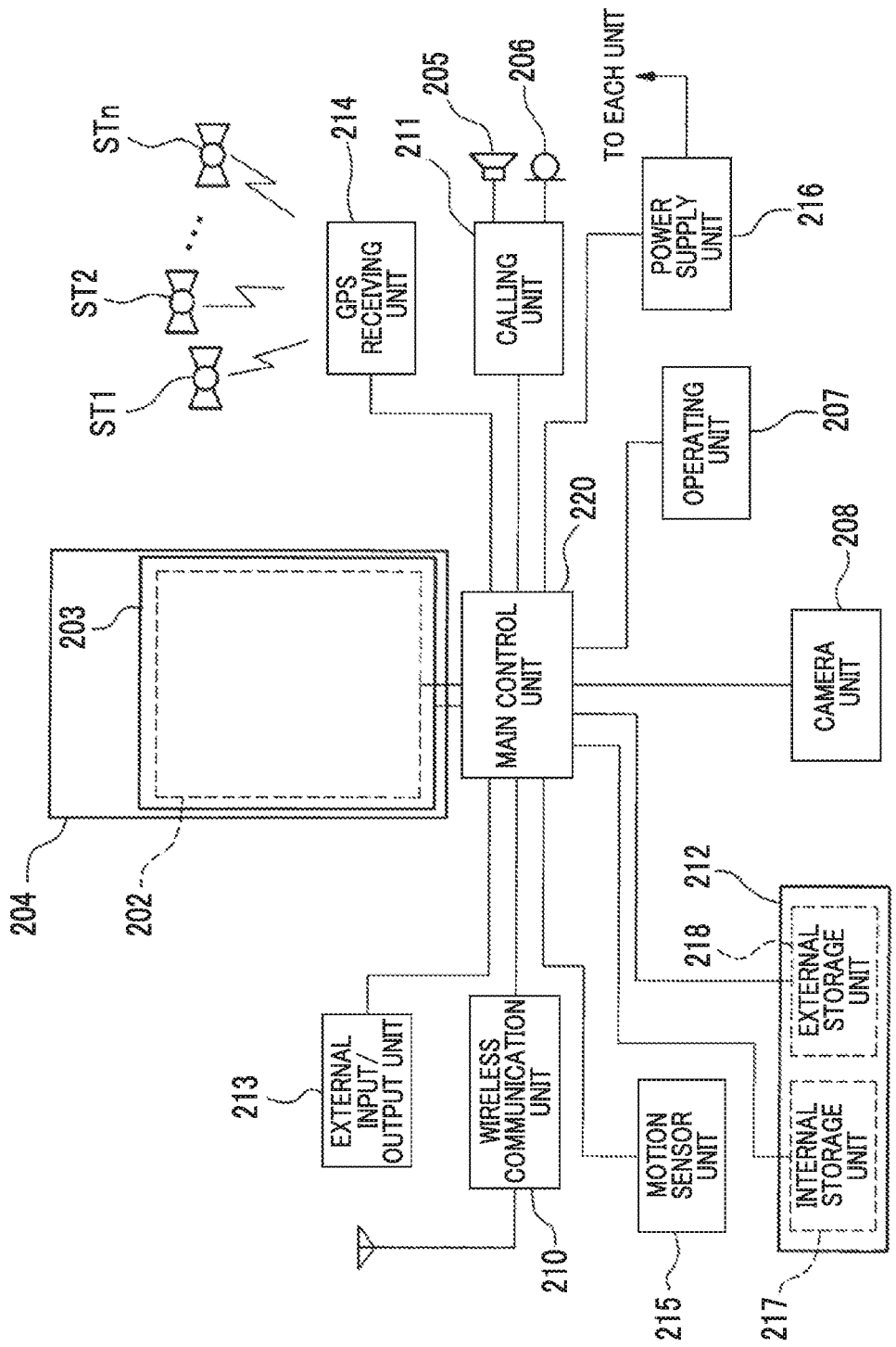

IMAGING APPARATUS AND IMAGE BLUR CORRECTION METHOD

CROSS REFERENCE TO RELATED APPLICATION

This is a continuation of international Application No. PCT/JP2015/081893 filed on Nov. 12, 2015, and claims priority from Japanese Patent Application No. 2014-244096 filed on Dec. 2, 2014, the entire disclosures of which are incorporated herein by reference.

BACKGROUND OF THE INVENTION

1. Field of the Invention

The present invention relates to an imaging apparatus and an image blur correction method.

2. Description of the Related Art

An imaging apparatus has been known which corrects an image blur caused by the shake of the imaging apparatus due to, for example, a hand shake. The shake of the imaging apparatus includes an angular shake of the imaging apparatus about an axis perpendicular to an optical axis and a translational shake of the imaging apparatus in an axial direction perpendicular to the optical axis.

In the correction of an image blur caused by a rotational shake, in general, an angular velocity about the axis perpendicular to the optical axis is detected and the amount of rotational shake of the imaging apparatus is calculated. Then, a correction optical system or an imaging element is moved such that an image blur on an imaging surface of the imaging element is cancelled, on the basis of the amount of rotational shake.

In the correction of an image blur caused by the translational shake, acceleration in an axial direction perpendicular to the optical axis is detected and the amount of translational shake of the imaging apparatus is calculated. Then, the correction optical system or the imaging element is moved such that an image blur on the imaging surface of the imaging element is cancelled, on the basis of the amount of translational shake.

The influence of the translational shake varies depending on the object distance. In high magnification imaging at a short object distance, the influence of the translational shake increases. JP1995-225405A (JP-H07-225405) and JP1998-301157A (JP-H10-301157A) disclose an imaging apparatus that detects the position of a focus lens, acquires an object distance on the basis of the position of the focus lens, and corrects an image blur on the basis of the acquired object distance. In addition, JP2012-128356A discloses an imaging apparatus which calculates the amount of movement of the imaging apparatus in an optical axis direction from acceleration acting in the optical axis direction and corrects an object distance on the basis of the calculated amount of movement.

JP2005-173431A discloses an auto-focus device that comprises a so-called voice coil motor including a driving coil and a magnet. When a current is supplied to the driving coil, a driving force corresponding to the supplied current is generated by the voice coil motor and a focus lens is moved by the driving force of the voice coil motor.

Typically, feedback (closed loop) control that detects the position of a focus lens and aligns the detected position with a target focus position is used for focusing. In contrast, the auto-focus device disclosed in JP2005-173431A, the focus lens is biased in the optical axis direction by a holder spring and a current for generating a driving force matched with the biasing three of the holder spring at the focus position of the focus lens is supplied to the driving coil to move the focus lens to the focus position.

As such, in the auto-focus device disclosed in JP2005-173431A, open loop control in which the feedback of the position of the focus lens is omitted is performed for focusing and a position sensor is not required. Therefore, the size and weight of the auto-focus device are reduced.

SUMMARY OF THE INVENTION

In the auto-focus device disclosed in JP2005-173431A, basically, the current supplied to the driving coil corresponds to the position of the focus lens and it is possible to acquire an object distance from the current supplied to the driving coil. However, in a case in which force is applied to the focus lens in the optical axis direction by the influence of, for example, gravity, the focus lens is displaced. Therefore, the current supplied to the driving coil does not correspond to the position of the focus lens and the accuracy of calculating the object distance which is acquired from the current supplied to the driving coil is reduced.

The invention has been made in view of the above-mentioned problems and an object of the invention is to provide an imaging apparatus and an image blur correction method that can improve the accuracy of calculating an object distance with a simple structure and can accurately correct an image blur.

According to an aspect of the invention, there is provided an imaging apparatus comprising: a driving unit that moves a focus lens; a focusing unit that determines a focus state and outputs a focusing signal indicating a focus position of the focus lens; a control unit that controls the driving unit on the basis of the focusing signal; an acceleration detection unit that detects acceleration of the imaging apparatus in directions of three orthogonal axes; a distance calculation unit that calculates an acceleration component in an optical axis direction on the basis of the acceleration in the directions of the three orthogonal axes detected by the acceleration detection unit and calculates an object distance corresponding to the focus position indicated by the focusing signal on the basis of the acceleration component in the optical axis direction; and a shake correction unit that corrects an image blur caused by a translational shake in the directions of two orthogonal axes perpendicular to at least an optical axis on the basis of the object distance calculated by the distance calculation unit and the acceleration in the directions of the three orthogonal axes detected by the acceleration detection unit.

According to another aspect of the invention, there is provided an image blur correction method comprising: a focusing step of moving a focus lens on the basis of a focusing signal indicating a focus position; an acceleration detection step of detecting acceleration in directions of three orthogonal axes which acts on an imaging apparatus; a distance calculation step of calculating an acceleration component in an optical axis direction on the basis of the acceleration in the direction of each axis detected in the acceleration detection step and calculating an object distance corresponding to the focus position indicated by the focusing signal on the basis of the acceleration component in the optical axis direction; and a shake correction step of correcting an image blur caused by a translational shake in the directions of two orthogonal axes perpendicular to at least an optical axis on the basis of the object distance calculated in the distance calculation step and the acceleration in the directions of the three orthogonal axes detected in the acceleration detection step.

According to the invention, it is possible to provide an imaging apparatus and an image blur correction method that can improve the accuracy of calculating an object distance with a simple structure and can accurately correct an image blur.

BRIEF DESCRIPTION OF THE DRAWINGS

FIG. 9 is a diagram illustrating the structure of the imaging apparatus illustrated in FIG. 8.

DESCRIPTION OF THE PREFERRED EMBODIMENTS

Figure 1:
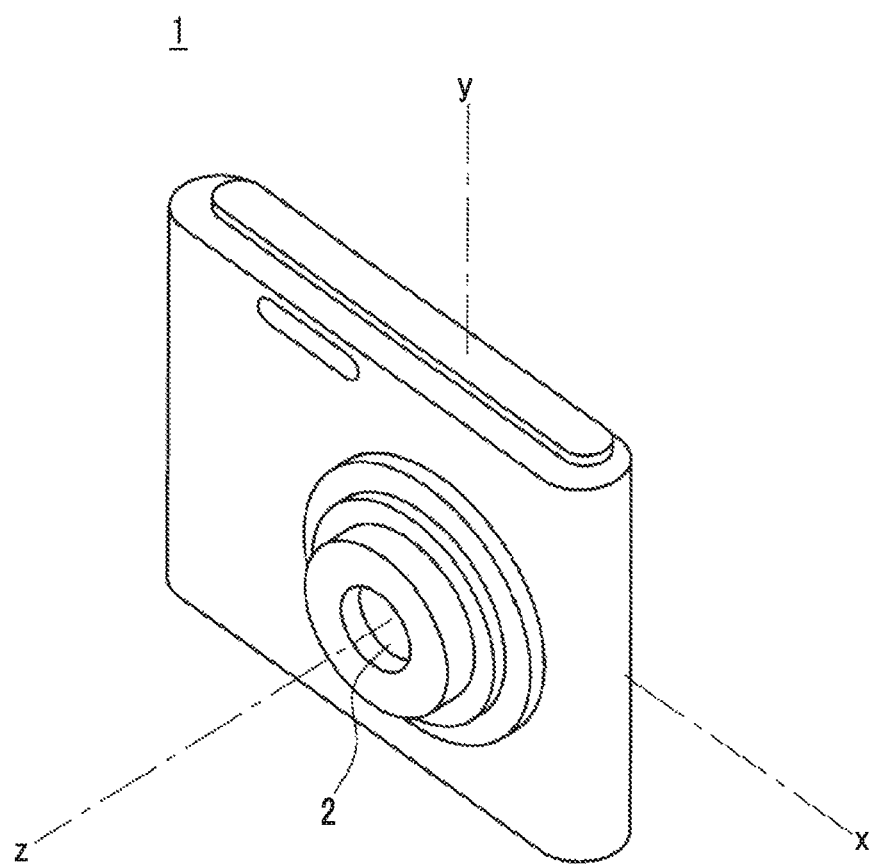
FIG. 1 is a diagram illustrating the outward appearance of an example of an imaging apparatus for describing an embodiment of the invention.
Figure 2:
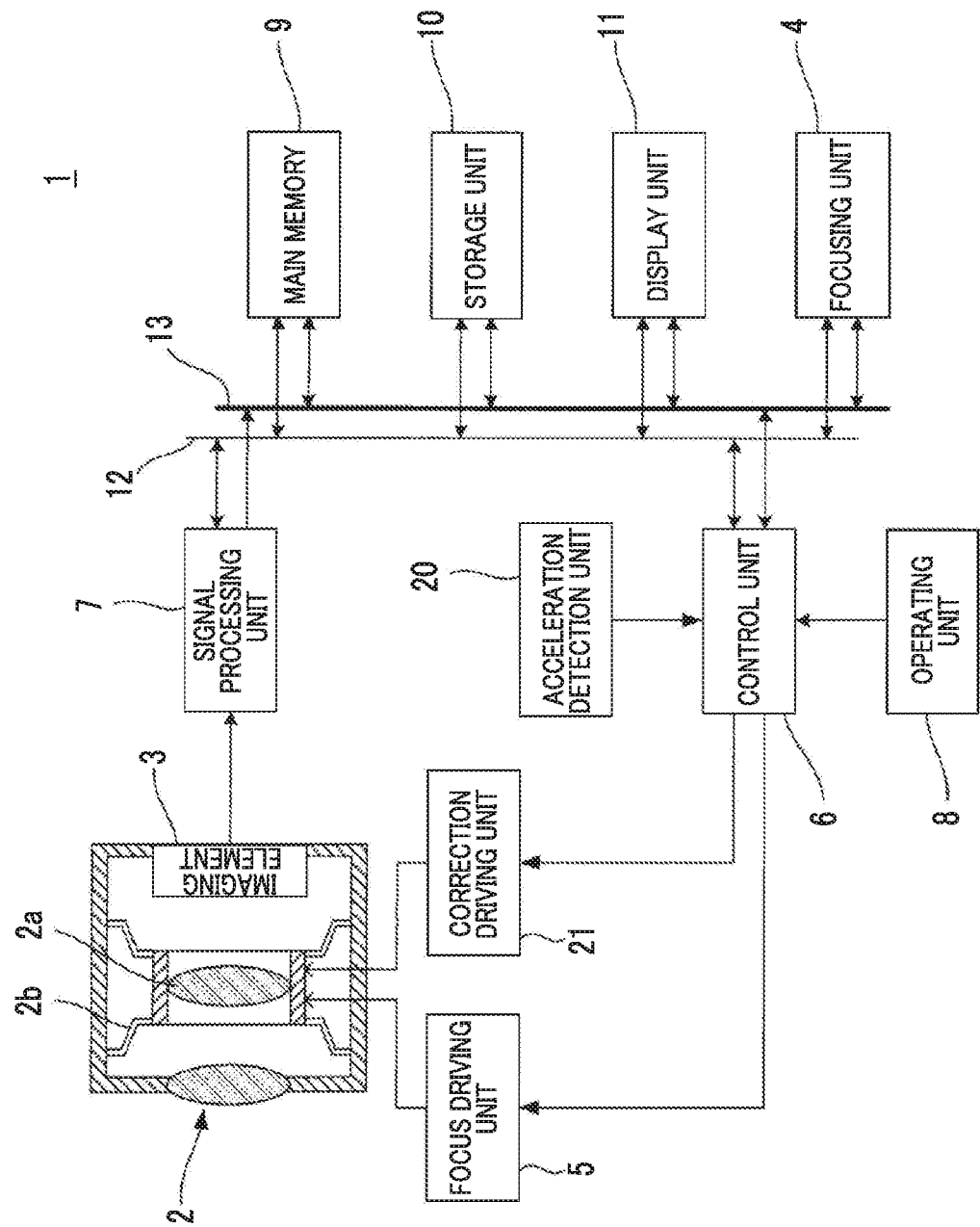
FIG. 2 is a block diagram illustrating the structure of the imaging apparatus illustrated in FIG. 1.

FIG. 1 illustrates the outward appearance of an example of an imaging apparatus for describing an embodiment of the invention and FIG. 2 illustrates the structure of the imaging apparatus illustrated in FIG. 1.

A digital camera 1 which is an example of the imaging apparatus illustrated in FIGS. 1 and 2 comprises an imaging optical system 2 including, for example, a movable lens 2a as a focus lens that is supported so as to be movable in an optical axis direction (z-axis direction) and the directions (an x-axis direction and a y-axis direction) of two axes perpendicular to the optical axis direction, an imaging element 3 that captures an image of an object through the imaging optical system 2, a focusing unit 4 that determines a focus position of the movable lens 2a, a focus driving unit 5 that moves the movable lens 2a in the z-axis direction, and a control unit 6.

The movable lens 2a is elastically supported by a holder spring 2b so as to be movable in the directions of the x-axis, the y-axis, and the z-axis in a housing of the digital camera 1.

For example, a charge coupled device (CCD) image sensor or a complementary metal oxide semiconductor (CMOS) image sensor is used as the imaging element 3.

A signal processing unit 7 performs analog signal processing, such as a correlated double sampling process, for an output signal from the imaging element 3 to convert the output signal into a digital signal. Then, the signal processing unit 7 performs digital signal processing, such as an interpolation operation, a gamma correction operation, or an RGB/YC conversion process, for the digital signal obtained by converting the output signal from the imaging element 3 to generate image data.

The focusing unit 4 determines a focus state, using an AF system, such as a contrast system, on the basis of the image data generated by the signal processing unit 7 and determines the focus position of the movable lens 2a. Then, the focusing unit 4 outputs a focusing signal indicating the determined focus position to the control unit 6.

The focus driving unit 5 is a so-called voice coil motor includes a magnet and a driving coil which are disposed so as to face each other. One of the magnet and the driving coil is fixed to the movable lens 2a. A driving force to move the movable lens 2a in the z-axis direction is generated according to a driving current supplied to the driving coil.

An instruction signal, such as imaging instruction from a user, is input from an operating unit 8 to the control unit 6. The control unit 6 drives the imaging element 3 in response to the imaging instruction such that the imaging element 3 captures images.

The digital camera 1 includes a main memory 9 that stores, for example, setting information, a storage unit 10 including a storage medium, such as a memory card that stores the image data generated by the signal processing unit 7, and a display unit 11 including a display panel, such as a liquid crystal display panel that displays a menu or the image data generated by the signal processing unit 7.

The focusing unit 4, the signal processing unit 7, the main memory 9, the storage unit 10, and the display unit 11 are connected to each other by a control bus 12 and a data bus 13 and are controlled by commands from the control unit 6.

A focusing signal indicating the focus position of the movable lens 2a is input from the focusing unit 4 to the control unit 6. The control unit 6 controls the focus driving unit 5 on the basis of the focusing signal such that the movable lens 2a is held at the focus position indicated by the focusing signal. In this example, the focus driving unit 5 is a voice coil motor and the focusing signal indicates the value of a driving current supplied to the driving coil.

The digital camera 1 further comprises an acceleration detection unit 20 that detects acceleration acting on the digital camera 1 and a correction driving unit 21 that corrects an image blur on an imaging surface of the imaging element 3 caused by the shake of the digital camera 1. In this example, the movable lens 2a which functions as a focus lens and is moved in the z-axis direction by the focus driving unit 5 is moved in the directions of the x-axis and the y-axis by the correction driving unit 21 to correct an image blur.

An image blur correction lens may be provided as the focus lens separately from the movable lens 2a and may be moved in the directions of the x-axis and the y-axis to correct an image blur. Alternatively, the imaging element 3 may be moved in the directions of the x-axis and the y-axis to correct an image blur. In a case, the movable lens 2a may be movable in the z-axis direction.

Figure 3:
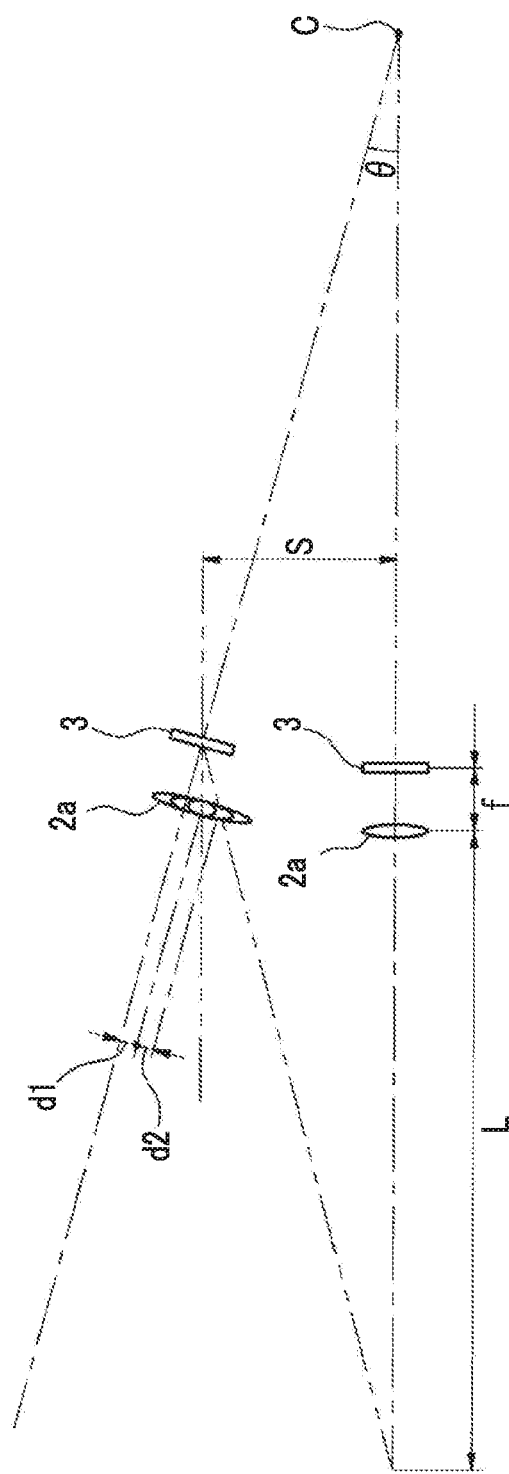
FIG. 3 is a diagram schematically illustrating the relationship between an object distance and the amount of movement of a lens in image blur correction.

FIG. 3 schematically illustrates the relationship between an object distance and the amount of movement of the movable lens 2a in image blur correction.

The shake of the digital camera 1 caused by a hand shake can be typically regarded as rotation about a rotation center C that is located closer to a photographer than the imaging surface of the imaging element 3 and includes a rotational shake at an angle $\theta$ and a translational shake at a distance S.

When a focal length is f and the object distance is L, the amount of movement d1 of the movable lens 2a corresponding to the amount of rotational shake at the angle θ can be represented by d1≈fθ and the amount of movement d2 of the movable lens 2a corresponding to the amount of translational shake at the distance S can be represented by d2≈f·S/L. This shows that the amount of movement of the movable lens 2a corresponding to the translational shake relates to the object distance L and the influence of the translational shake increases as the object distance L decreases.

The object distance L corresponds to the focus position of the movable lens 2a and also corresponds to the focusing signal indicating the focus position.

Here, gravity acts on the movable lens 2a and the movable lens 2a is elastically supported by the holder spring 2b. In a state in which the movable lens 2a is held at a predetermined position, the driving force which is generated by the focus driving unit 5 on the basis of the focusing signal under the control of the control unit 6, the elastic force of the holder spring 2b, and a z-axis direction component of gravity acting on the movable lens 2a are balanced in the z-axis direction.

The z-axis direction component of gravity acting on the movable lens 2a is changed by the posture of the digital camera 1. Therefore, even when the movable lens 2a is located at the same focus position, the driving force generated by the focus driving unit 5, that is, the focusing signal varies depending on the posture of the digital camera 1. In other words, even when the focusing signal is the same, the focus position indicated by the focusing signal varies depending on the posture of the digital camera 1.

In this example, the object distance L corresponding to the focus position indicated by the focusing signal is calculated according to the posture of the digital camera 1 and an image blur caused by the translational shake is corrected using the calculated object distance L.

Figure 4:
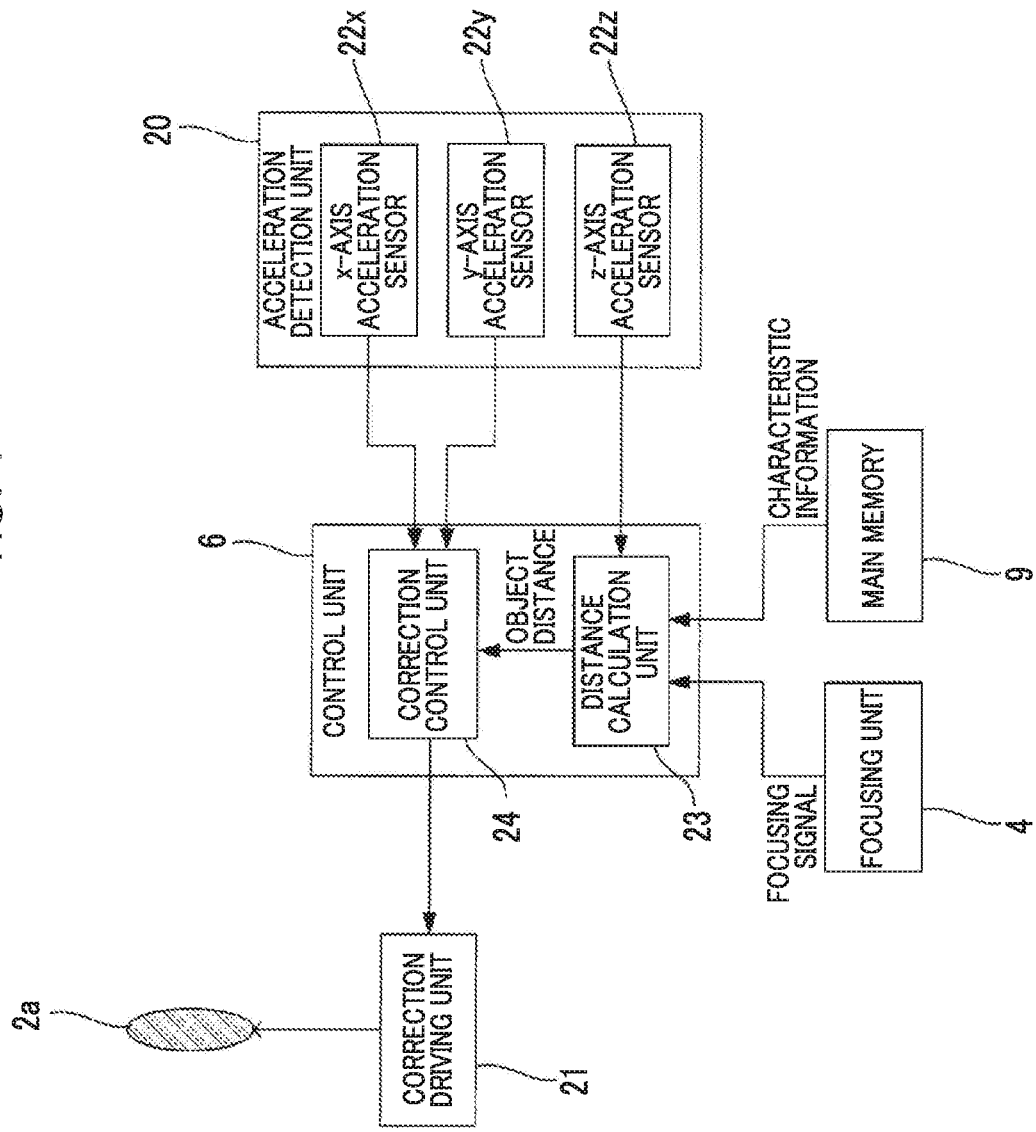
FIG. 4 is a diagram illustrating the structure of an example of an image blur correction system of the imaging apparatus illustrated in FIG. 1.

FIG. 4 illustrates a functional block of an image blur correction system of the digital camera 1.

The acceleration detection unit 20 includes an acceleration sensor 22x that detects acceleration in the x-axis direction, an acceleration sensor 22y that detects acceleration in the y-axis direction, and an acceleration sensor 22z that detects acceleration in the z-axis direction.

The control unit 6 includes a distance calculation unit 23 that calculates an object distance and a correction control unit 24 that controls the correction driving unit 21.

The distance calculation unit 23 calculates an acceleration component in the optical axis direction on the basis of the acceleration in three orthogonal axes detected by the acceleration detection unit 20. In this example, since the detection direction of the acceleration sensor 22z is aligned with the optical axis direction, the acceleration component in the optical axis direction is the same as the acceleration detected by the acceleration sensor 22z.

Then, the distance calculation unit 23 calculates an object distance corresponding to the focus position indicated by the focusing signal on the basis of the acceleration detected by the acceleration sensor 22z. An object distance calculation method will be described below.

The correction control unit 24 performs second-order integration for the acceleration in the x-axis direction detected by the acceleration sensor 22x and the acceleration in the y-axis direction detected by the acceleration sensor 22y to calculate the amounts of translational shake in the directions of the x-axis and the y-axis.

Then, the correction control unit 24 calculates the amounts of movement of the movable lens 2a in the directions of the x-axis and the y-axis on the basis of the calculated amounts of translational shake in the directions of the x-axis and the y-axis and the object distance calculated by the distance calculation unit 23.

Then, the correction control unit 24 controls the correction driving unit 21 such that the movable lens 2a is moved in the directions of the x-axis and the y-axis by the calculated amounts of movement of the movable lens 2a. In this way, an image blur caused by the translational shake of the digital camera 1 is corrected.

A shake correction unit for correcting an image blur is formed by the correction control unit 24, the correction driving unit 21, and the movable lens 2a as a correction lens.

The correction driving unit 21 may be a voice coil motor, similarly to the focus driving unit 5.

Figures 5, 6:
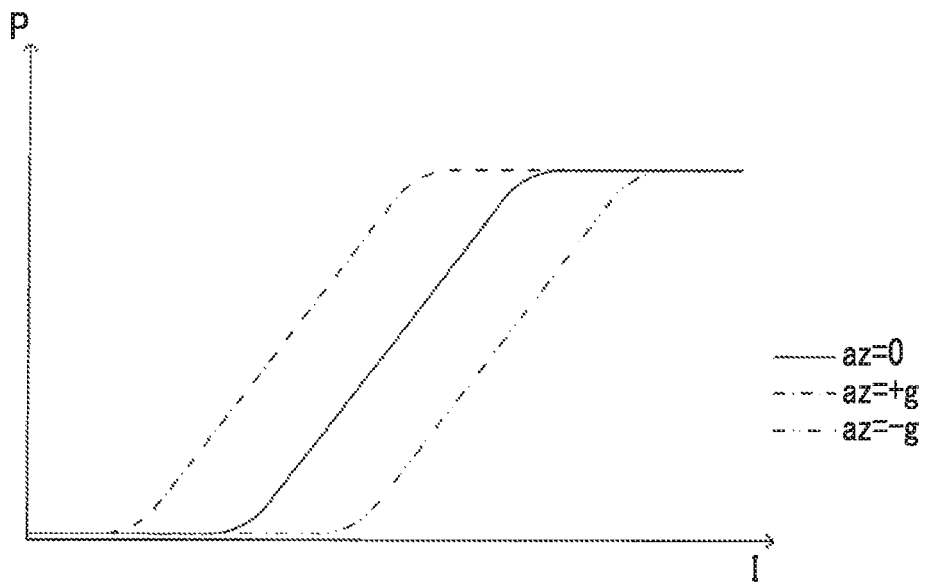
FIG. 5 is a diagram illustrating the principle of an object distance calculation method in the imaging apparatus illustrated in FIG. 1.
FIG. 6 is a diagram illustrating an example of the object distance calculation method in the imaging apparatus illustrated in FIG. 1.

FIG. 5 illustrates the principle of the object distance calculation method and FIG. 6 illustrates an example of the object distance calculation method.

The object distance can be calculated by characteristic information in which the correlation between a focusing signal I and the position P of the movable lens 2a moved on the basis of the focusing signal I is represented by a relationship with acceleration az in the z-axis direction.

FIG. 5 illustrates the correlation between the focusing signal I and the position P of the movable lens 2a moved on the basis of the focusing signal I in a case in which the acceleration az in the z-axis direction is 0 (the digital camera 1 is disposed horizontally), in a case in which the acceleration az in the z-axis direction is +g (the digital camera 1 faces downward in the vertical direction), and in a case in which the acceleration az in the z-axis direction is −g (the digital camera 1 faces upward in the vertical direction) when the object side is the positive direction of the z-axis and the acceleration of gravity is g.

In the example illustrated in FIG. 6, for the correlation between the focusing signal I and the position P of the movable lens 2a illustrated in FIG. 5, the position $P_{m,n}$ of the movable lens 2a at the value $I_n$ (n=0, 1, 2, . . . ) of the focusing signal is acquired for each value $az_m$ (m=0, 1, 2, . . . ) of acceleration in the z-axis direction in advance and a data table in which the focusing signal $I_n$ and the position $P_{m,n}$ are associated with each other is used as the characteristic information. The data table is stored in, for example, the main memory 9.

For example, the distance calculation unit 23 calculates the focus position indicated by the focusing signal at the acceleration detected by the acceleration sensor 22z with reference to the data table stored in the main memory 9. In addition, for example, a focus position corresponding to the values of acceleration and a focusing signal which are not included in the data table can be appropriately interpolated and calculated from the focus positions corresponding to the values of acceleration and focusing signals before and after the values of the acceleration and the focusing signal in the data table.

Then, the distance calculation unit 23 calculates an object distance corresponding to the calculated focus position. The correspondence between the focus position and the object distance is determined by the optical design of the imaging optical system 2.

The characteristic information may be described by a function having the focusing signal I as a variable. As illustrated in FIG. 5, a characteristic line indicating the correlation between the focusing signal I and the position P of the movable lens 2a moved on the basis of the focusing signal I is shifted along the horizontal axis corresponding to the focusing signal according to the acceleration az in the z-axis direction. Therefore, for example, a characteristic line in a case in which the acceleration az in the z-axis direction is 0 can be represented by a function P=f(I) having the focusing signal I as a variable and the characteristic information can be represented by P=f(I−k·az). Here, k is an appropriate coefficient.

In this way, even in a case in which acceleration acts on the movable lens 2a in the optical axis direction due to, for example, gravity, it is possible to calculate the focus position of the movable lens 2a indicated by the focusing signal with high accuracy. Therefore, the object distance can be accurately calculated by open loop control in which the feedback of the position of the movable lens 2a is omitted and it is possible to accurately correct an image blur on the basis of the object distance.

Figure 7:
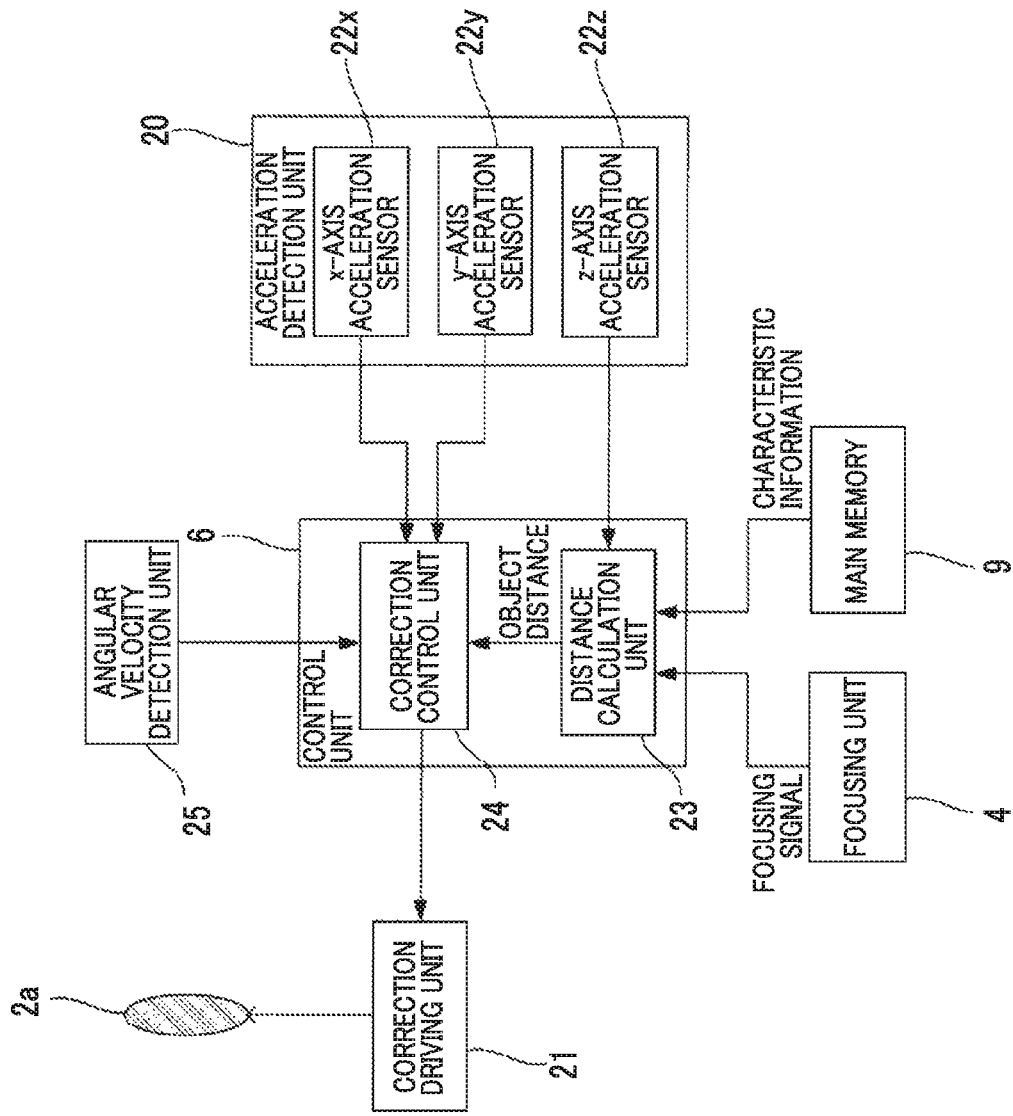
FIG. 7 is a diagram illustrating the structure of a modification example of the imaging apparatus illustrated in FIG. 1.

FIG. 7 illustrates the structure of a modification example of the digital camera 1.

In the example illustrated in FIG. 7, the digital camera 1 further comprises an angular velocity detection unit 25 that detects an angular velocity about the x-axis and the y-axis which acts on the digital camera 1 and corrects an image blur caused by an angular shake in addition to a translational shake.

As described above, the correction control unit 24 performs second-order integration for acceleration in the directions of the x-axis and the y-axis detected by the acceleration detection unit 20 to calculate the amounts of translational shake in the directions of the x-axis and the y-axis. In addition, the correction control unit 24 integrates the angular velocity about the x-axis and the y-axis detected by the angular velocity detection unit 25 to calculate the amounts of rotational shake about the x-axis and the y-axis.

Then, the correction control unit 24 calculates the amounts of movement of the movable lens 2a in the directions of the x-axis and the y-axis, on the basis of the calculated amounts of translational shake in the directions of the x-axis and the y-axis, the calculated amounts of rotational shake about each axis, and the object distance L calculated by the distance calculation unit 23.

Then, the correction control unit 24 controls the correction driving unit 21 such that the movable lens 2a is moved in the directions of the x-axis and the y-axis by the calculated amounts of movement of the movable lens 2a. In this way, an image blur caused by the translational shake and the angular shake of the digital camera 1 is corrected.

The digital camera 1 has been described above as an example of the imaging apparatus. Next, an embodiment of a smart phone with a camera as the imaging apparatus will be described.

Figure 8:
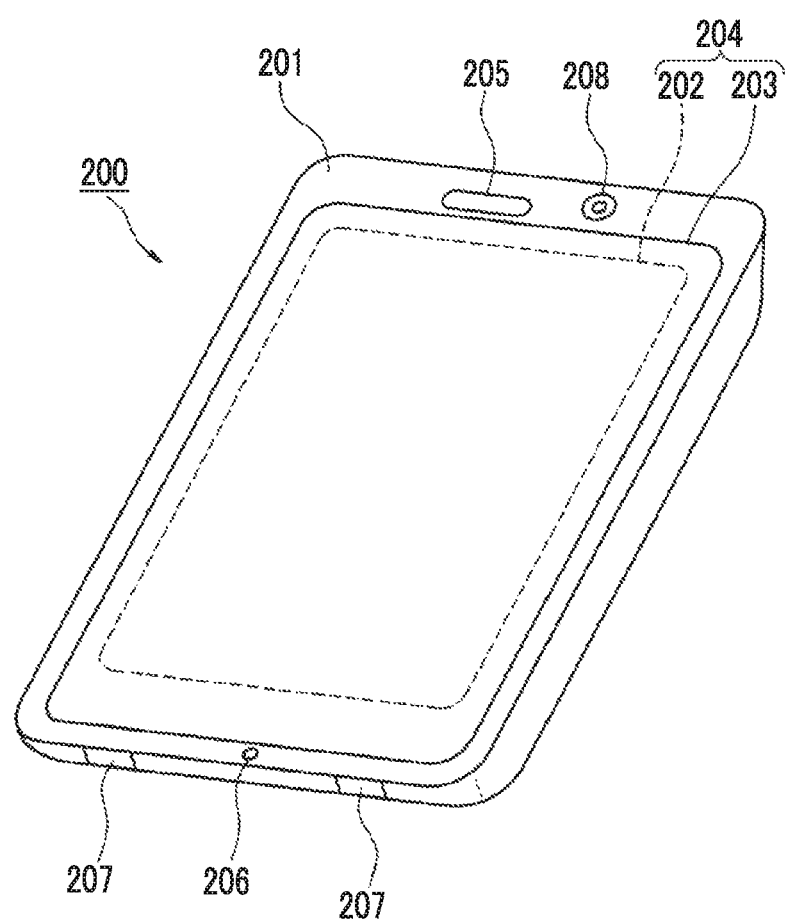
FIG. 8 is a diagram illustrating the outward appearance of an example of an imaging apparatus for describing the embodiment of the invention.

FIG. 8 illustrates the outward appearance of a smart phone 200 which is an embodiment of the imaging apparatus according to the invention.

The smart phone 200 illustrated in FIG. 8 includes a housing 201 with a flat panel shape. The smart phone 200 comprises a display input unit 204 having a display panel 202 as a display unit and an operation panel 203 as an input unit which are integrally formed on one surface of the housing 201. The housing 201 includes a speaker 205, a microphone 206, an operating unit 207, and a camera unit 208. However, the configuration of the housing 201 is not limited thereto. For example, the display unit and the input unit may be independently provided or the housing 201 may have a folding structure or a sliding structure.

FIG. 9 illustrates the structure of the smart phone 200 illustrated in FIG. 8.

As illustrated in FIG. 9, the smart phone 200 comprises, as main components, a wireless communication unit 210, the display input unit 204, a calling unit 211, the operating unit 207, the camera unit 208, a storage unit 212, an external input/output unit 213, a global positioning system (GPS) receiving unit 214, a motion sensor unit 215, a power supply unit 216, and a main control unit 220. In addition, the smart phone 200 has, as a main function, a wireless communication function which performs mobile wireless communication through a base station apparatus BS (not illustrated) and a mobile communication network NW (not illustrated).

The wireless communication unit 210 performs wireless communication with the base station apparatus BS which is accommodated in the mobile communication network NW in response to an instruction from the main control unit 220. The wireless communication is used to transmit and receive various types of file data, such as voice data and image data, and electronic mail data or to receive, for example, web data or streaming data.

The display input unit 204 is a so-called touch panel that displays, for example, images (still images and moving images) or text information to visually transmit information to the user and detects the user's operation for the displayed information under the control of the main control unit 220 and comprises the display panel 202 and the operation panel 203.

The display panel 202 uses, for example, a liquid crystal display (LCD) or an organic electro-luminescence display (OELD) as a display device.

The operation panel 203 is a device that is provided such that an image displayed on a display surface of the display panel 202 can be visually recognized and detects one or a plurality of coordinate points operated by a finger of the user or a stylus. When the device is operated by a finger of the user or a stylus, a detection signal which is generated by the operation is output to the main control unit 220. Then, the main control unit 220 detects an operation position (coordinates) on the display panel 202 on the basis of the received detection signal.

As illustrated in FIG. 8, the display panel 202 and the operation panel 203 of the smart phone 200 that is exemplified as an embodiment of the imaging apparatus according to the invention are integrated to form the display input unit 204 and the operation panel 203 is provided so as to completely cover the display panel 202.

In a case in which this structure is used, the operation panel 203 may have a function of detecting the user's operation even in a region other than the display panel 202. In other words, the operation panel 203 may comprise a detection region (hereinafter, referred to as a display region) for an overlap portion which overlaps the display panel 202 and a detection region (hereinafter, referred to as a non-display region) for an outer edge portion which does not overlap the display panel 202.

The size of the display region may be exactly equal to the size of the display panel 202. However, the sizes are not necessarily equal to each other. The operation panel 203 may comprise two sensitive regions, that is, an outer edge portion and an inner portion other than the outer edge portion. The width of the outer edge portion is appropriately designed according to, for example, the size of the housing 201. Examples of a position detection method which is used in the operation panel 203 include a matrix switching method, a resistive film method, a surface elastic wave method, an infrared method, an electromagnetic induction method, and a capacitive sensing method. Any of the methods may be used.

The calling unit 211 comprises the speaker 205 and the microphone 206. The calling unit 211 converts the voice of the user which is input through the microphone 206 into voice data which can be processed by the main control unit 220 and outputs the converted voice data to the main control unit 220. In addition, the calling unit 211 decodes voice data received by the wireless communication unit 210 or the external input/output unit 213 and outputs the decoded voice data from the speaker 205. As illustrated in FIG. 8, for example, the speaker 205 can be mounted on the same surface as the display input unit 204 and the microphone 206 can be mounted on the side surface of the housing 201.

The operating unit 207 is a hardware key which uses, for example, a key switch and receives instructions from the user. For example, as illustrated in FIG. 8, the operating unit 207 is a push button switch which is mounted on the side surface of the housing 201 of the smart phone 200, is turned on when it is pressed by, for example, a finger, and is turned off by the restoring force of a spring when the finger is taken off.

The storage unit 212 stores a control program or control data of the main control unit 220, application software, address data which is associated with, for example, the names or phone numbers of communication partners, transmitted and received electronic mail data, web data which is downloaded by web browsing, or downloaded content data. In addition, the storage unit 212 temporarily stores, for example, streaming data. The storage unit 212 includes an internal storage unit 217 which is provided in the smart phone and an external storage unit 218 which has a slot for a detachable external memory. The internal storage unit 217 and the external storage unit 218 fainting the storage unit 212 may be implemented by a storage medium, such as a flash memory type, a hard disk type, a multimedia-card-micro-type memory, a card-type memory (for example, a MicroSD (registered trademark) memory), a random access memory (RAM), or a read only memory (ROM).

The external input/output unit 213 functions as an interface with all of the external apparatuses connected to the smart phone 200 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB) (registered trademark) network, or a ZigBee (registered trademark) network).

Examples of the external apparatus connected to the smart phone 200 include a wired/wireless headset, a wired/wireless external charger, a wired/wireless data port, a memory card which is connected through a card socket, a subscriber identity module (SIM) card/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit 213 can transmit data which is received from the external apparatus to each component of the smart phone 200 or can transmit data in the smart phone 200 to the external apparatus.

The GPS receiving unit 214 receives UPS signals transmitted from GPS satellites STI to STn and performs a position measurement process on the basis of a plurality of received GPS signals to detect a position including the latitude, longitude, and height of the smart phone 200, in response to an instruction from the main control unit 220. When the GPS receiving unit 214 can acquire positional information from the wireless communication unit 210 or the external input/output unit 213 (for example, a wireless LAN), it can detect the position using the positional information.

The motion sensor unit 215 comprises, for example, a triaxial acceleration sensor and detects the physical movement of the smart phone 200 in response to an instruction from the main control unit 220. When the physical movement of the smart phone 200 is detected, the moving direction or acceleration of the smart phone 200 is detected. The detection result is output to the main control unit 220.

The power supply unit 216 supplies power which is stored in a battery (not illustrated) to each unit of the smart phone 200 in response to an instruction from the main control unit 220.

The main control unit 220 comprises a microprocessor, operates on the basis of the control program or control data stored in the storage unit 212, and controls the overall operation of each unit of the smart phone 200. The main control unit 220 has an application processing function and a mobile communication control function of controlling each unit of a communication system in order to perform voice communication or data communication through the wireless communication unit 210.

The application processing function is implemented by the operation of the main control unit 220 based on the application software which is stored in the storage unit 212. Examples of the application processing function include an infrared communication function which controls the external input/output unit 213 such that data communication with an opposing apparatus is performed, an electronic mail function which transmits and receives electronic mail, and a web browsing function which browses web pages.

The main control unit 220 has, for example, an image processing function which displays an image on the display input unit 204 on the basis of image data (still image data or moving image data) such as received data or downloaded streaming data. The image processing function means the function of the main control unit 220 decoding the image data, performing image processing on the decoding result, and displaying the image on the display input unit 204.

The main control unit 220 performs display control for the display panel 202 and operation detection control for detecting the operation of the user through the operating unit 207 and the operation panel 203. The main control unit 220 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 202.

The main control unit 220 performs the operation detection control to detect the operation of the user input through the operating unit 207, to receive an operation for the icon or the input of a character string to an input field of the window through the operation panel 203, or to receive a request to scroll the displayed image through the scroll bar.

In addition, the main control unit 220 has a touch panel control function that performs the operation detection control to determine whether the position of an operation for the operation panel 203 is an overlap portion (display region) which overlaps the display panel 202 or an outer edge portion (non-display region) which does not overlap the display panel 202 other than the overlap portion and controls a sensitive region of the operation panel 203 or the display position of the software key.

The main control unit 220 can detect a gesture operation for the operation panel 203 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 208 includes the structures of the imaging optical system 2, the imaging element 3, the focusing unit 4, the focus driving unit 5, the control unit 6, the signal processing unit 7, the main memory 9, and the acceleration detection unit 20 in the digital camera 1 illustrated in FIG. 2.

The image data generated by the camera unit 208 can be recorded in the storage unit 212 or can be output through the external input/output unit 213 or the wireless communication unit 210.

In the smart phone 200 illustrated in FIG. 8, the camera unit 208 is mounted on the same surface as the display input unit 204. However, the mounting position of the camera unit 208 is not limited thereto. For example, the camera unit 208 may be mounted on the rear surface of the display input unit 204.

The camera unit 208 can be used for various functions of the smart phone 200. For example, the image acquired by the camera unit 208 can be displayed on the display panel 202 or the image acquired by the camera unit 208 can be used as one of the operation inputs of the operation panel 203.

When the GPS receiving unit 214 detects the position, the position may be detected with reference to the image from the camera unit 208. In addition, the optical axis direction of the camera unit 208 in the smart phone 200 may be determined or the current usage environment may be determined, with reference to the image from the camera unit 208, using the triaxial acceleration sensor or without using the triaxial acceleration sensor. Of course, the image from the camera unit 208 may be used in the application software.

In addition, for example, the position information acquired by the GPS receiving unit 214, the voice information acquired by the microphone 206 (for example, the voice information may be converted into text information by the main control unit), and the posture information acquired by the motion sensor unit 215 may be added to still image data or moving image data and the image data may be recorded in the storage unit 212 or may be output through the external input/output unit 213 or the wireless communication unit 210.

In the smart phone 200 having the above-mentioned structure, it is possible to accurately calculate the object distance and to accurately correct an image blur on the basis of the object distance.

As described above, an imaging apparatus disclosed in the specification comprises: a driving unit that moves a focus lens; a focusing unit that determines a focus state and outputs a focusing signal indicating a focus position of the focus lens; a control unit that controls the driving unit on the basis of the focusing signal; an acceleration detection unit that detects acceleration in directions of three orthogonal axes; a distance calculation unit that calculates an acceleration component in an optical axis direction on the basis of the acceleration in the directions of the three orthogonal axes detected by the acceleration detection unit and calculates an object distance corresponding to the focus position indicated by the focusing signal on the basis of the acceleration component in the optical axis direction; and a shake correction unit that corrects an image blur caused by a translational shake in the directions of two orthogonal axes perpendicular to at least an optical axis on the basis of the object distance calculated by the distance calculation unit and the acceleration in the directions of the three orthogonal axes detected by the acceleration detection unit.

The distance calculation unit calculates the object distance corresponding to the focus position indicated by the focusing signal on the basis of the acceleration component in the optical axis direction, using characteristic information in which a correlation between the focusing signal and a position of the focus lens moved on the basis of the focusing signal is represented by a relationship with the acceleration in the optical axis direction.

The characteristic information is a data table in which the focusing signal and the position of the focus lens moved on the basis of the focusing signal are associated with each other for each of a plurality of acceleration values in the optical axis direction.

In the imaging apparatus, the characteristic information is a function having the focusing signal as a variable.

In the imaging apparatus, the driving unit includes a voice coil motor that includes a magnet and a driving coil and generates a driving force to move the focus lens according to a driving current supplied to the driving coil, and the focusing signal indicates a value of the driving current.

The imaging apparatus further comprises an angular velocity detection unit that detects an angular velocity about the two orthogonal axes. The shake correction unit corrects an image blur caused by a rotational shake about the two orthogonal axes on the basis of the angular velocity about the two orthogonal axes detected by the angular velocity detection unit.

An image blur correction method disclosed in the specification comprises: a focusing step of moving a focus lens on the basis of a focusing signal indicating a focus position; an acceleration detection step of detecting acceleration in directions of three orthogonal axes which acts on an imaging apparatus; a distance calculation step of calculating an acceleration component in an optical axis direction on the basis of the acceleration in the direction of each axis detected in the acceleration detection step and calculating an object distance corresponding to the focus position indicated by the focusing signal on the basis of the acceleration component in the optical axis direction; and a shake correction step of correcting an image blur caused by a translational shake in the directions of two orthogonal axes perpendicular to at least an optical axis on the basis of the object distance calculated in the distance calculation step and the acceleration in the directions of the three orthogonal axes detected in the acceleration detection step.

In the distance calculation step, the object distance corresponding to the focus position indicated by the focusing signal is calculated on the basis of the acceleration component in the optical axis direction, using characteristic information which is acquired in advance and in which a correlation between the focusing signal and a position of the focus lens moved on the basis of the focusing signal is represented by a relationship with the acceleration in the optical axis direction.

The characteristic information is a data table in which the focusing signal and the position of the focus lens moved on the basis of the focusing signal are associated with each other for each of a plurality of acceleration values in the optical axis direction.

The characteristic information is a function having the focusing signal as a variable.

The image blur correction method further comprises an angular velocity detection step of detecting an angular velocity about the two orthogonal axes in the shake correction step, an image blur caused by a rotational shake about the two orthogonal axes is corrected on the basis of the angular velocity about the two orthogonal axes detected in the angular velocity detection step.

INDUSTRIAL APPLICABILITY

The invention can be used in various types of electronic apparatuses that capture images through an imaging optical system including a focus lens for focusing.

The embodiment of the invention has been described in detail above. However, the embodiment of the invention is just an example and various modifications and changes of the invention can be made without departing from the scope and spirit of the invention. This application is based on JP2014-244096, filed on Dec. 2, 2014, the content of which is incorporated herein by reference.

EXPLANATION OF REFERENCES

1: digital camera
2: imaging optical system
2a: movable lens (focus lens)
3: imaging element
4: focusing unit
5: focus driving unit
6: control unit
20: acceleration detection unit
21: correction driving unit
22: acceleration detection unit
23: distance calculation unit
24: correction control unit
25: angular velocity detection unit

What is claimed is:

1. An imaging apparatus comprising:
a driving unit that moves a focus lens;
a focusing unit that determines a focus state and outputs a focusing signal indicating a focus position of the focus lens;
a control unit that controls the driving unit based on the focusing signal;
an acceleration detection unit that detects acceleration of the imaging apparatus in directions of three orthogonal axes;
a distance calculation unit that calculates an acceleration component in an optical axis direction based on the acceleration in the directions of the three orthogonal axes detected by the acceleration detection unit and calculates an object distance corresponding to the focus position indicated by the focusing signal based on the acceleration component in the optical axis direction; and
a shake correction unit that corrects an image blur caused by a translational shake in directions of two orthogonal axes perpendicular to at least an optical axis based on the object distance calculated by the distance calculation unit and the acceleration in the directions of the three orthogonal axes detected by the acceleration detection unit,
wherein the distance calculation unit calculates the object distance corresponding to the focus position indicated by the focusing signal based on the acceleration component in the optical axis direction, using characteristic information in which a correlation between the focusing signal and a position of the focus lens moved based on the focusing signal is represented by a relationship with the acceleration in the optical axis direction, and
wherein at least one hardware processor implements the focusing unit, the control unit, the distance calculation unit, and the shake correction unit.

2. The imaging apparatus according to claim 1,
wherein the characteristic information is a data table in which the focusing signal and the position of the focus lens moved based on the focusing signal are associated with each other for each of a plurality of acceleration values in the optical axis direction.

3. The imaging apparatus according to claim 2,
wherein the driving unit includes a voice coil motor that includes a magnet and a driving coil and generates a driving force to move the focus lens according to a driving current supplied to the driving coil, and
the focusing signal indicates a value of the driving current.

4. The imaging apparatus according to claim 3, further comprising:
an angular velocity detection unit that detects an angular velocity about the two orthogonal axes,
wherein the shake correction unit corrects an image blur caused by a rotational shake about the two orthogonal axes based on the angular velocity about the two orthogonal axes detected by the angular velocity detection unit.

5. The imaging apparatus according to claim 2, further comprising:
an angular velocity detection unit that detects an angular velocity about the two orthogonal axes,
wherein the shake correction unit corrects an image blur caused by a rotational shake about the two orthogonal axes based on the angular velocity about the two orthogonal axes detected by the angular velocity detection unit.

6. The imaging apparatus according to claim 1,
wherein the characteristic information is a function having the focusing signal as a variable.

7. The imaging apparatus according to claim 6,
wherein the driving unit includes a voice coil motor that includes a magnet and a driving coil and generates a driving force to move the focus lens according to a driving current supplied to the driving coil, and
the focusing signal indicates a value of the driving current.

8. The imaging apparatus according to claim 7, further comprising:
an angular velocity detection unit that detects an angular velocity about the two orthogonal axes,
wherein the shake correction unit corrects an image blur caused by a rotational shake about the two orthogonal axes based on the angular velocity about the two orthogonal axes detected by the angular velocity detection unit.

9. The imaging apparatus according to claim 6, further comprising:
an angular velocity detection unit that detects an angular velocity about the two orthogonal axes,
wherein the shake correction unit corrects an image blur caused by a rotational shake about the two orthogonal axes based on the angular velocity about the two orthogonal axes detected by the angular velocity detection unit.

10. The imaging apparatus according to claim 1,
wherein the driving unit includes a voice coil motor that includes a magnet and a driving coil and generates a driving force to move the focus lens according to a driving current supplied to the driving coil, and
the focusing signal indicates a value of the driving current.

11. The imaging apparatus according to claim 10, further comprising:
an angular velocity detection unit that detects an angular velocity about the two orthogonal axes,
wherein the shake correction unit corrects an image blur caused by a rotational shake about the two orthogonal axes based on the angular velocity about the two orthogonal axes detected by the angular velocity detection unit.

12. The imaging apparatus according to claim 1, further comprising:
an angular velocity detection unit that detects an angular velocity about the two orthogonal axes,
wherein the shake correction unit corrects an image blur caused by a rotational shake about the two orthogonal axes based on the angular velocity about the two orthogonal axes detected by the angular velocity detection unit.

13. The imaging apparatus according to claim 1, wherein the at least one hardware processor comprises a first processor implementing the focusing unit and a second processor implementing the control unit, the distance calculation unit, and the shake correction unit.

14. An image blur correction method comprising:
moving a focus lens based on a focusing signal indicating a focus position;
detecting acceleration in directions of three orthogonal axes which acts on an imaging apparatus;
calculating an acceleration component in an optical axis direction based on the acceleration in the directions of the three orthogonal axes detected in the acceleration detection step and calculating an object distance corresponding to the focus position indicated by the focusing signal based on the acceleration component in the optical axis direction; and
correcting an image blur caused by a translational shake in directions of two orthogonal axes perpendicular to at least an optical axis based on the object distance calculated in the distance calculation step and the acceleration in the directions of the three orthogonal axes detected in the acceleration detection step,
wherein, in the calculating the object distance, the object distance corresponding to the focus position indicated by the focusing signal is calculated based on the acceleration component in the optical axis direction, using characteristic information which is acquired in advance and in which a correlation between the focusing signal and a position of the focus lens moved based on the focusing signal is represented by a relationship with the acceleration in the optical axis direction.

15. The image blur correction method according to claim 14,
wherein the characteristic information is a data table in which the focusing signal and the position of the focus lens moved based on the focusing signal are associated with each other for each of a plurality of acceleration values in the optical axis direction.

16. The image blur correction method according to claim 15, further comprising:
detecting an angular velocity about the two orthogonal axes,
wherein an image blur caused by a rotational shake about the two orthogonal axes is corrected based on the detected angular velocity about the two orthogonal axes.

17. The image blur correction method according to claim 14,
wherein the characteristic information is a function having the focusing signal as a variable.

18. The image blur correction method according to claim 17, further comprising:
detecting an angular velocity about the two orthogonal axes,
wherein an image blur caused by a rotational shake about the two orthogonal axes is corrected based on the detected angular velocity about the two orthogonal axes.

19. The image blur correction method according to claim 14, further comprising:
detecting an angular velocity about the two orthogonal axes,
wherein an image blur caused by a rotational shake about the two orthogonal axes is corrected based on the detected angular velocity about the two orthogonal axes.

* * * * *